April 5, 1949. B. L. MYERS 2,466,262
TOGGLE AND CAM OPERATED OPPOSED FRICTION CLUTCH
Filed Jan. 14, 1946
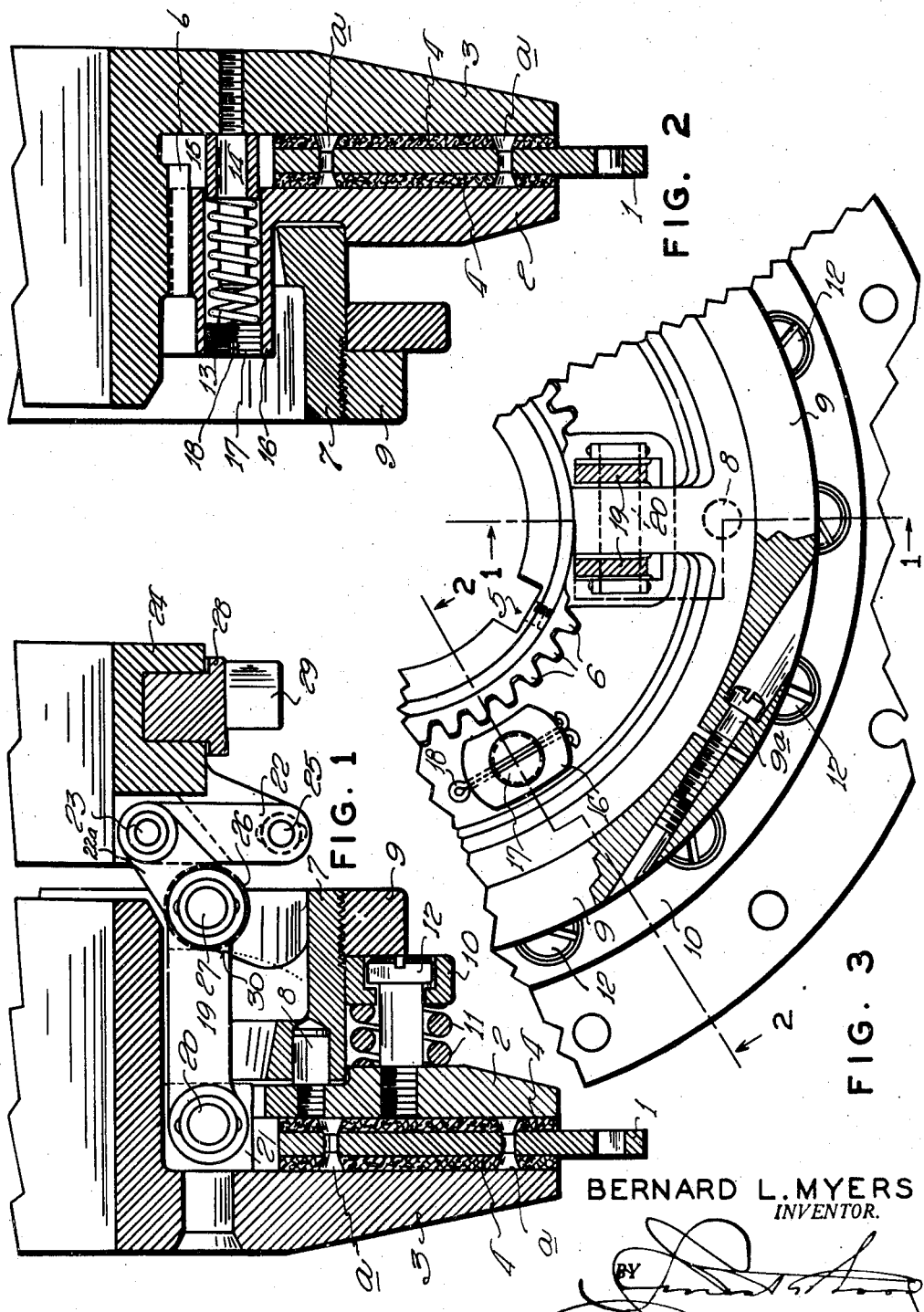
BERNARD L. MYERS
INVENTOR.

Patented Apr. 5, 1949

2,466,262

UNITED STATES PATENT OFFICE 2,466,262

TOGGLE AND CAM OPERATED OPPOSED FRICTION CLUTCH

Bernard L. Myers, Dallas, Tex.

Application January 14, 1946, Serial No. 641,069

7 Claims. (Cl. 192—68)

1

This invention relates to single or multiple disc friction clutches and more particularly to clutches of the mechanical toggle type.

The principal object of the invention is to provide, in a clutch of the character set forth, an improved positive differential toggle, accessibility for replacement of release springs and preloaded springs, which automatically compensate for wear on the friction plates instead of manual adjustment at frequent intervals as required on most conventional clutches of corresponding types.

It is a further object of the invention to provide a variable toggle ratio with a resulting flexibility of control and higher mechanical ratio not present in conventional friction clutches. The toggle is so arranged that when, in the disengaged position, centrifugal force tends to hold it disengaged and precludes any possibility of self-engagement.

Another object of the invention resides in the location of release springs and the mode of ready replacement thereof without dismantling the clutch. By disposing the release springs at a forward position in the clutch, contrary to the common practice of locating these springs between the front and back driving plates, the period of usefulness of the springs is greatly increased by reason of their separation from the direct heat of the friction plate. Moreover, the springs are made readily accessible from the front of the clutch by the removal of a threaded plug.

Still another object of the invention is to provide automatic adjustment, compensating for wear on the friction disc through the medium of preloaded springs capable of carrying the entire clutch load and not only prevent overloading the clutch but also control the amount of stress imposed on the toggle parts and insure greater life and fewer repairs.

With the foregoing objects as paramount the invention has further reference to certain features of accomplishment which will become apparent as the description proceeds taken in connection with the accompanying drawing wherein:

Figure 1 is a fragmentary view of the invention in vertical section, taken on line 1—1 on Figure 3.

Figure 2 is a view similar to Figure 1, taken on line 2—2 on Figure 3, and

Figure 3 is a fragmentary front elevational view of the clutch from which has been deleted the disengaging collar and the forward part of the toggles.

Continuing with a more detailed description

2 of the drawing, reference numeral 1 denotes the driven member of the clutch and is comprised of one or more friction plates arranged to be gripped by a front plate 2 and a rear plate 3 constituting parts of the driving member of the clutch. Friction discs 4 are attached to the driven member 1 with rivets or other suitable means $a$. The back or rear driving member 3 is keyed to a shaft, not shown, by means of a key inserted in the key-way 5. The front driving member 2 is movable axially in relation to the member 3 and held in a non-rotatable position by teeth 6.

The driven member 1 may be bolted directly to a machine element, such as a pulley or spider, not shown, and when compressed between driving members 2 and 3, will drive the pulley or spider, as the case may be.

The driven member 1 may obviously be constructed with peripheral teeth engageable with corresponding teeth on the machine element, such as a pulley or spider and transmit power thereto when the driven member is interposed, as described, between driving members 2 and 3. When the clutch is released by recession of member 2, the said machine element is thereby released and is free to rotate idly on the shaft and independent of the clutch. The shaft may either be a driving shaft or a driven shaft, according to whether the power is transmitted to or by the shaft.

A slidable operating member 7 is rotatably and slidably connected with the driving member 2 by means of a plurality of pins 8. An internally threaded ring 9 is screwed onto the threaded portion of member 7 and abuts against the spring retainer 10, serving to transmit forward thrust of the operating member 7 through springs 11 to driving member 2 and to transmit backward thrust of member 2 to the operating member 7.

The ring 9 functions as an adjusting nut which may be screwed up or tightened to adjust the driving member 2 axially in relation to the operating member 7, if and when necessary to compensate for wear on the friction disc 4. To permit this adjustment, the driving member 2 has a sliding fit on pins 8 and operating member 7. Means for locking the adjusting ring 9 is provided by splitting the latter and employing a clamp screw $9a$ which contracts the ring 9 firmly on the operating member 7, as shown in Figure 3.

The springs 11 are held in place by the retainer 10 and are preloaded and guided by shoulder screws 12. The forward thrust of the operating member 7 is transmitted to the driven member 1 through adjusting ring 9 to retainer 10 and then through springs 11 to member 2. The function of springs 11 is to carry the entire forward thrust load against the driving member 2 and to provide automatic adjustment for wear on friction disc 4. Retainer 10 is arranged for an axial sliding fit on screws 12 and to set the clutch for automatic adjustment, the adjusting ring 9 is screwed forward until, when the clutch is in the engaged position, the retainer ring 10 will be away from the underside of screw head 12 about 1/32" or to suit, and this amount of wear will be compensated for by springs 11 before further manual adjustment of ring 9 is necessary. If desired, the clutch can be adjusted in the conventional manner by removing spring 11 and let ring 9 apply pressure directly to the heads of the screws 12.

The operating member 7 is actuated by a toggle mechanism operable to force the member 2 towards member 3 and thereby bind or clamp the driven member 1, interposed therebetween, to apply the clutch, this action being resisted by release springs 13 interposed between the driving members 2 and 3, which tend to press the member 2 backwards, or away, from member 3 to release the clutch. Release spring 13 is positioned and guided by a stud 14 and pressure is applied to member 3 through spacer 15 (Fig. 2). Release spring 13 is housed in a boss 16 which is an integral part of member 2. A threaded plug 17 acts as a retainer for spring 13 and permits replacement of the latter by the simple expedient of removing cotter key 18 and unscrewing plug 17.

The above mentioned toggle mechanism is comprised of three toggles equally spaced around the clutch. Each toggle consists of a pair of horizontal links; a vertical link and a roller to operate on a vertical, variable angle cam. This toggle differs from others, due to approaching dead center when the clutch is fully engaged, thereby reaching the greatest mechanical advantage obtainable from a link toggle or cam.

Each toggle consists of a pair of horizontal links 19, pivoted to driving member 3 by means of a pin 20 and lug 21. Vertical link 22 is pivoted at one end to a third or intermediate link 22a by means of a pin 23 and the opposite end of link 22 is interposed pivotally between lugs on engaging collar 24 by means of a pin 25. The opposite end of the intermediate link 22a is pivotally interposed between the ends of links 19. This connection with the operating member 7 is provided by roller 26, which is interposed between horizontal links 19 and is rotatable on a pin 27 which latter is also the pivot for link 22a. Forward thrust is applied to operating member 7 by roller 26 on the cam face 30 which is interposed between horizontal links 19 and is an integral part of operating member 7. Further reference to the cam face will be made presently. Engaging collar 24 is slidably mounted on the main shaft, not shown, and receives forward thrust through thrust collar 28 which is split for installation on the engaging collar 24 and is provided with two, diametrically opposed trunnions 29 for engagement by the yoked end of any suitable clutch shifting lever, not shown.

When forward thrust is applied through collar 28 to engaging collar 24, link 22 approaches a true vertical position; links 19 approach a true horizontal position and roller 26 applies forward thrust to the operating member 7 by approaching the high point on cam 30 and, due to the leverage advantage of the toggle, great force is applied through the operating member 7 and driving member 2, thereby forcibly pressing the member 2 against driven member 1 and effecting the powerful gripping of the member 1 by the opposed driving members 2 and 3.

Manifestly, the construction as shown and described, is capable of some modification and such modification as may be construed to fall within the scope and meaning of the appended claims is also considered to be within the spirit and intent of the invention.

What is claimed is:

1. In a friction clutch, coaxial driving members and an interposing driven member frictionally engageable between said first members, a shaft embracing hub integral with one of said driving members, a plurality of toggle link assemblies each comprising a link pivoted at its inner end to said latter driving member and movable relative to a plane parallel with the axis of said hub, a cam face formed integrally on the other of said driving members adjacent the outer end of said link, a roller mounted on the outer end of said link and operatable on said cam face, a clutch engaging collar slidably disposed on a shaft forwardly of said latter driven member and having a plurality of toggle links pivoted thereto each having an end pivotally joining the outer end of a corresponding one of said first mentioned links whereby said first and second mentioned links will respectively lie parallel with and perpendicularly to the axis of the shaft when said clutch engaging collar is operatively moved to dispose said rollers on the high points of said cam faces.

2. A friction clutch comprising a stationary and a movable driving member mounted on a shaft and a driven member frictionally engageable between said driving members, the stationary driving member having an integral hub embracing said shaft, said movable member having a plurality of radially arranged cam faces therein, a plurality of toggle link assemblies, each comprising a link pivoted to said hub and movable relative to a plane parallel therewith, a roller carried by the end of said link and operable on its respective cam face, a clutch engaging member slidable on said shaft radially spaced links pivoted to said slidable member and movable relative to a plane perpendicular to said shaft, each having an end pivoted to an end of a corresponding one of said first links whereby movement of said clutch engaging member to advance said movable driven member will be effective to move said links to their prescribed positions to dispose said rollers on the high points of said cam faces to effect positive engagement of said driving members with said driven member.

3. A friction clutch comprising in combination with a shaft a stationary driving member having a hub fixed to said shaft and a movable driven member slidably mounted on said hub, a driven member frictionally interposed between the faces of said driving members, a clutch engaging member slidable on said shaft, a plurality of toggle link assemblies, each comprising a link pivoted at one end to said hub and displaceable relative to a plane parallel with the axis of said hub, a second link pivoted to said clutch engaging member displaceable relative to a plane perpendicular to the axis of said shaft, and a third link pivotally connecting the ends of said first and second links, a cam face integral with said movable driving member complementary to each link assembly, a roller carried by the outer end of said first link and effective to bear against the high point of said cam face to impose an axial force on said movable driving member to effect engagement of said driving members with said driven member.

4. In a friction clutch, a driving member having a hub stationarily mounted on a shaft, a movable driving member slidable on said hub having a plurality of cam faces radially arranged therein, a driven member adapted to be frictionally engaged between said driving members, means for establishing driving relation between said driving members and said driven member comprising a clutch engaging collar and a plurality of toggle assemblies, each consisting of a link pivoted to said hub and movable relative to a plane parallel therewith, a second link carried by said clutch engaging collar and movable relative to a plane perpendicular to said shaft, an intermediate link connecting said first and second links, a roller carried by said first link and operable on a corresponding cam face to advance said movable driving member into operative relationship with said stationary driving member to frictionally engage said driven member, spring means resisting engaging movement of said movable driving member and means carried on the face of said latter member for adjusting the compressive force of said spring means.

5. A friction clutch comprising a pair of driving members, one of which is fixed and the other slidable on a common shaft, an engaging and disengaging collar, a series of toggle assemblies, each consisting of a compression link pivoted to said fixed member, a tension link pivoted to said collar and an intermediate link pivotally joining the ends of said compression and tension links, a cam face on said movable driving member complementary to each of said toggle assemblies, a roller carried by said compression link cooperating with said cam face to impose a force effective to axially move said slidable member relative to said fixed member, a driven member interposed between said driving members and adapted to be frictionally engaged thereby, spring means resisting movement of said slidable member and means on the outer face of said latter member for adjusting the compression of said spring means.

6. The structure as set forth in claim 5, further defined in that the means resisting engaging movement of the slidable member consists of interiorly threaded, hollow bosses circumferentially spaced about the axis of said member containing compression springs imposing a force against the fixed clutch member and a plug threaded into the end of each of said bosses to bear against the opposite ends of said springs.

7. A friction clutch as described in claim 5 further defined in that the forward thrust load of the slidable member is cushioned by springs spaced circumferentially therearound, retainers for said springs and means for advancing or retracting said retainers to vary the compressive force of said springs.

BERNARD L. MYERS.

REFERENCES CITED

The following references are of record in the file of this patent:

UNITED STATES PATENTS

| Number | Name | Date |
| --- | --- | --- |
| 1,883,394 | Mosher et al. | Oct. 18, 1932 |
| 2,026,733 | Fast | Jan. 7, 1936 |